(12) United States Patent
Taylor et al.

(10) Patent No.: US 12,708,853 B2
(45) Date of Patent: Aug. 18, 2026

(54) TIMED INPUT/ACTION RELEASE

(71) Applicant: Sony Interactive Entertainment Inc., Tokyo (JP)

(72) Inventors: Michael Taylor, San Mateo, CA (US); Yasunori Matsui, San Mateo, CA (US); Yurika Kondo, Tokyo (JP); Mihee Kang, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 206 days.

(21) Appl. No.: 18/348,298

(22) Filed: Jul. 6, 2023

(65) Prior Publication Data

US 2025/0010199 A1 Jan. 9, 2025

(51) Int. Cl.
*A63F 13/67* (2014.01)
*A63F 13/213* (2014.01)

(52) U.S. Cl.
CPC ............ *A63F 13/67* (2014.09); *A63F 13/213* (2014.09)

(58) Field of Classification Search
None
See application file for complete search history.

(56) References Cited

U.S. PATENT DOCUMENTS 10,765,944 B2 * 9/2020 Dantas de Castro ........................ A63F 13/577
11,717,748 B2 * 8/2023 Bleasdale-Shepherd .................... A63F 13/358 463/31
2012/0238364 A1 9/2012 Kurita et al.
2015/0297986 A1 10/2015 Dal Mutto et al.
2018/0345128 A1 * 12/2018 Ahmed ................. A63F 13/537
2020/0078679 A1 * 3/2020 Dantas de Castro ... G06T 13/00
2020/0129851 A1 4/2020 Sardari et al.
2021/0146241 A1 * 5/2021 Bleasdale-Shepherd .................... G06N 20/00
2021/0154583 A1 * 5/2021 Osman ................... G06N 20/00
2023/0009378 A1 1/2023 Borovikov et al.
2025/0010181 A1 1/2025 Taylor et al.

OTHER PUBLICATIONS

"International Search Report and Written Opinion", dated Oct. 16, 2024, from the counterpart PCT application PCT/US24/33812.

* cited by examiner

*Primary Examiner* — Seng H Lim
(74) *Attorney, Agent, or Firm* — Fish & Richardson P.C.

(57) ABSTRACT

A machine learning-based model or other system is configured to release user commands to a computer game at a time when the command correctly aligns with what is going on in the computer game. As such, the command might be predicted and released before the user input action is completed, or might be delayed after completion and processing until a later time when the command is most appropriate for release.

20 Claims, 5 Drawing Sheets

230
260
240
270
250
200
210
280
290
220

TIMED INPUT/ACTION RELEASE

FIELD

The disclosure below relates generally to timed release of user commands to correctly interact with computer games.

BACKGROUND

As recognized herein, one of the technical challenges facing computer game system engineers and players alike is the need for effective input actions that are not mistimed or missed completely by the game system since that can adversely affect gameplay.

Specifically, user input actions might be performed using physical buttons on a video game controller. These actions are then processed by the game system to interact with the game content, but there can be latency between the user's input action and the system's subsequent processing and execution of the command. This in turn results in delayed execution of the command and unintended consequences in the game itself.

Furthermore, to compensate for this the user might begin providing commands earlier in anticipation of processor latency, but in instances where the system is not overly-consumed with other tasks, the system might act on the command quicker than expected. This in turn results in the command being executed too early.

There are currently no adequate solutions to the foregoing computer-related, technological problems.

SUMMARY

Accordingly, in one aspect an apparatus includes at least one processor assembly programmed with instructions to execute a computer game, to receive input from a sensor, and to determine a user command to the computer game based on the input. The at least one processor assembly is also programmed with instructions to control the computer game according to the user command. In particular, the computer game is controlled by controlling the computer game according to the user command in advance of the user completing the user command and/or by delaying control of the computer game according to the user command subsequent to the user completing the user command.

In one particular example embodiment, the sensor may include a camera. Here, the at least one processor assembly may be programmed with instructions to receive input from the camera, determine the user command based on the input from the camera, and control the computer game according to the user command in advance of the user completing the user command. The user command might include a gesture command and/or a computer game controller command, and the apparatus may even include the camera itself. If desired, the at least one processor assembly may even be programmed with instructions to identify a game action as occurring for which the user command is to be executed, and then to control the computer game according to the user command in advance of the user completing the user command based on the identification.

Also in an example embodiment, the sensor may include a controller button. Here, the at least one processor assembly may be programmed with instructions to receive input generated based on actuation of the controller button, determine the user command based on the input generated based on actuation of the controller button, and control the computer game according to the user command by delaying control of the computer game according to the user command subsequent to the user completing the user command. Additionally, if desired the at least one processor assembly may specifically be programmed to delay control of the computer game according to the user command until a game action occurs for which the user command is to be executed, and then to execute the user command based on the game action occurring.

Still further, if desired, in one example implementation the at least one processor assembly may be programmed with instructions to use a machine learning (ML) model to infer the user command in advance of the user completing the user command.

Also if desired, the apparatus may include the at least one processor assembly itself.

In another aspect, a method includes receiving input from a sensor and determining, based on the input, a first user command to a first computer game. The method also includes controlling the first computer game according to the first user command. The first computer game is controlled according to the first user command by controlling the first computer game according to the first user command in advance of the user completing the first user command and/or by delaying control of the first computer game according to the first user command subsequent to the user completing the first user command.

In one particular example, the method may include providing camera input as an input to a machine learning (ML) model. The camera input may indicate the first user command. The method may also include receiving, as an output from an activation layer of the ML model, an inference of the first user command and then using the inference for the determination of the first user command. If desired, the ML model may be trained on at least one dataset of camera inputs and respective ground truth user commands. At least some of the camera inputs of the at least one dataset may show user gestures to actuate computer game controllers.

Also in certain example implementations, the method may include providing, as an input to a machine learning (ML) model, game state data and the first user command. The method may then include receiving, as an output from an activation layer of that ML model, an inference based on the game state data. The inference may indicate a first time at which to control the first computer game according to the first user command. The method may then include controlling, at the first time, the first computer game according to the first user command. In certain examples, the ML model itself may be trained on at least one dataset of game state data, user commands, and respective ground truth times at which to control one or more computer games.

In addition to or in lieu of the foregoing, in some examples the method may include using a rules-based software algorithm to determine, based on game state data and the first user command, a time at which to control the first computer game according to the first user command.

In still another aspect, a system includes at least one computer medium that is not a transitory signal. The at least one computer medium includes instructions executable by at least one processor assembly to determine a user command to a computer game and to release the user command to the computer game at a first time. The first time is a time during which a game action occurs for which the user command is to be executed, with the first time being different from a second time at which the user command is completed (and/or received/processed responsive to completion).

Thus, in certain examples the instructions may be executable to release the user command in advance of receiving input generated based on actuation of a computer game controller button that is predicted to be used to provide the user command. Additionally or alternatively, the instructions may be executable to delay release of the user command subsequent to the user completing the user command based on a determination that a game action has not yet occurred for which to apply the user command.

If desired, the system may even include the at least one processor assembly.

The details of the present application, both as to its structure and operation, can be best understood in reference to the accompanying drawings, in which like reference numerals refer to like parts, and in which:

DETAILED DESCRIPTION

Figure 1:
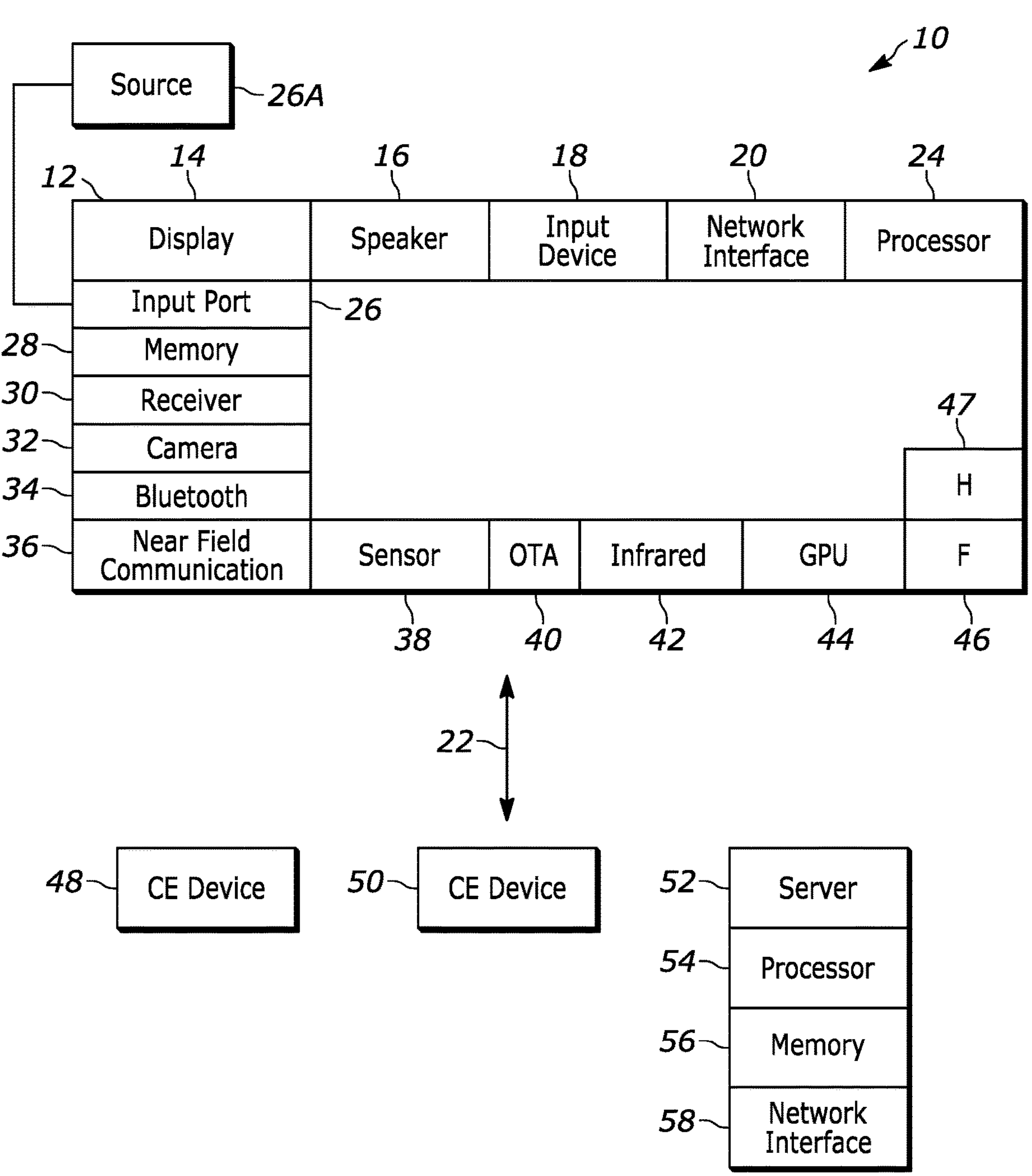
FIG. 1 is a block diagram of an example system consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor assembly may include one or more processors acting independently or in concert with each other to execute an algorithm, whether those processors are in one device or more than one device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled 5G ("smart") telephone, a tablet computer, a notebook computer, a head-mounted device (HMD) such as smart glasses or other wearable computerized device (e.g., AR or VR headset), a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a*, when implemented as a game console, may include some or all of the components described below in relation to the CE device 48**.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

With the foregoing in mind, present principles concern devices and computer-implemented methods for, during play of a computer game, predicting that a human player is about to push a video game controller button or perform a certain gesture in free space based on camera input. The device may also understand what is happening in the game and time the release of the action from the button press or gesture to correctly interact with the game content. For instance, the device might move up or delay the action if deemed appropriate, effectively rubber-banding the action for input to the game engine before or after the user actually inputs the action itself. The device thus releases the prediction at the right time for an intended operation, even if the user is slightly early or late in providing the input for the action. This in turn may help reduce latency and configure the device to execute the command at the most-appropriate time based on the execution environment itself, improving electronic gaming experiences in particular.

Thus, in one particular aspect a computer game controller prediction system may utilize camera input to anticipate user button presses or gestures. The camera may capture still images or video of the user interacting with an input device (e.g., button presses to the video game controller). The captured input may also include gestures in free space (e.g., sans controller or other electronic device in hand), and/or other physical actions performed by the user. The camera may be a standalone device or integrated into the gaming system, such as a webcam or a built-in camera in a gaming console. The system may employ machine learning algorithms, pattern recognition techniques, rules-based algorithms, and other suitable methods to predict the user's intended action and/or the system response thereto. The system may also consider game state data such as the game's context, current game level, character status, operative menu item, game mode, etc. to improve the accuracy of the prediction.

The system may thus analyze specific in-game events and synchronize the predicted action with the game content, potentially delaying the action. The system may therefore enhance user interaction and optimize gameplay responsiveness by releasing the predicted action at the appropriate time.

The input actions themselves that are commanded by the player might relate to, as non-exhaustive examples, moving a virtual character onscreen, having the user's character shoot another virtual character, selecting options from an onscreen menu, or controller trigger events. The computer game itself might be a two dimensional (2D) game presented on a television or computer monitor, or might be a virtual or augmented reality (more generally, extended reality) computer game presented on a headset or smartphone. However, further note that present principles may be applied in other technological areas as well, such as to non-gaming extended reality and other computing environments where user input is nonetheless used albeit not for gaming per se.

Additionally, note that present principles may also be used to ignore intentionally or accidentally/erroneously repeated commands, thus timing execution of the command per present principles based on the first time the command is received and then ignoring/discarding the same command if received again within a threshold amount of time of the initial command's receipt (e.g., ignore a repeated command if received within five seconds of the initial input of the command). For instance, this might occur in the case of gesture detection, like if a child spams the same gesture repeatedly to get the character to drink a health potion. Here, a health potion might only be drank once, even if there are multiple health potions in the player/kid's inventory that might otherwise be drank based on the repeated commands.

Figures 2, 3A:
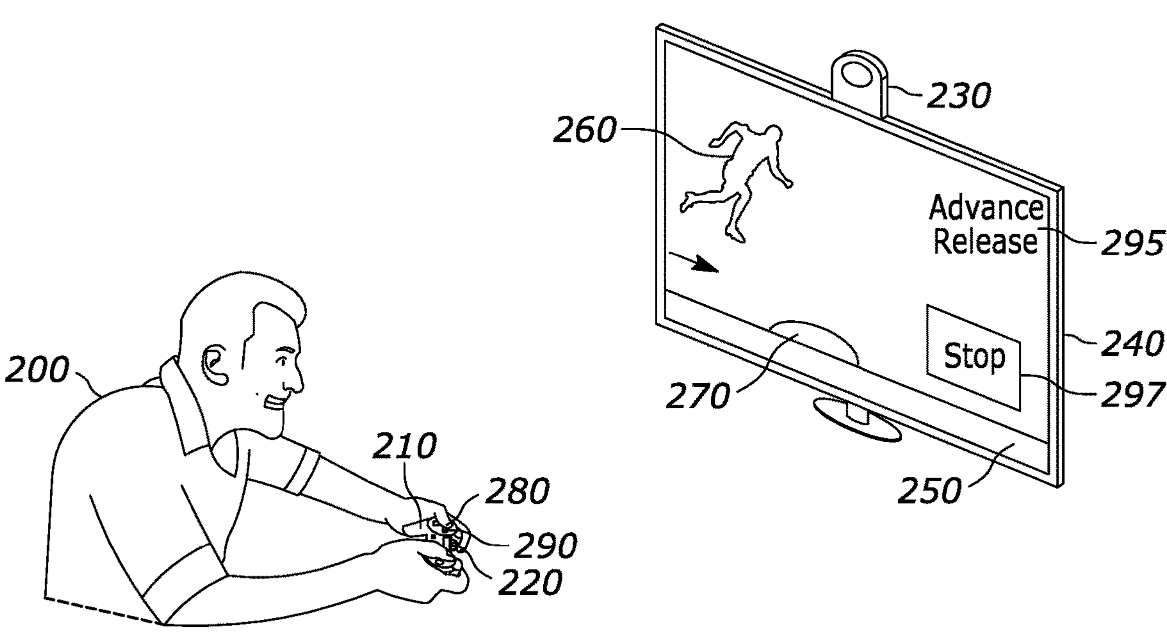
FIG. 2 is an example schematic consistent with present principles that shows a device releasing a user command to a computer game in advance of the user completing the user command, which is done based on a prediction of the user command.
FIGS. 3A and 3B are example schematics consistent with present principles that show a device delaying release of a user command to a computer game after the user completes the command.

Now in reference to FIG. 2, an example perspective view is shown of a player 200 with a computer game controller 210 in his/her hand. As shown, the controller 210 might have analog joysticks, triggers, and push buttons. As also shown, the controller 210 might include a digital camera 220 from which input showing the player 200 (e.g., hands in particular) may be received for determining/predicting user commands consistent with present principles. Additionally or alternatively, command determinations/predictions may be made using input showing the player 200 from a camera 230 on a television 240 that is presenting visual content 250 as part of the game. Note that the television 240 itself may include hardware components for executing the computer game, may communicate with a cloud-based server that is executing the computer game, and/or may communicate with a local video game console (not shown) that may be executing the computer game. Also note that the controller 210 may communicate wirelessly with any of those devices to provide user commands entered by the player 200 to the controller 210.

As shown in FIG. 2, the visual content 250 of the game includes video of a virtual character 260 controlled by the player as well as a virtual rock 270. Note here that while the player's thumb 280 has not yet touched and pressed a button 290 to provide a command to the game engine for the character 260 to jump over the rock 270, input from one or both of the cameras 220, 230 may be used by the hardware device(s) executing the computer game to predict in advance that the command will be provided via press of the button 290. The prediction may be based on the player 200 beginning to gesture/move the thumb 280 toward the button 290, for example. Or as another example, if the player's thumb continually rests on the button 290 while playing the game, one or both of the cameras 220, 230 may be used by the hardware device(s) to predict in advance that the player 200 is beginning a downward motion with the thumb 280 even if the button 290 has not been pressed downward enough/ completely to generate selection input yet. In either case, the prediction may then be used by the system to command the character 260 to jump at an appropriate time to successfully jump over the rock 270 even if the player 200 has not yet completed the actual command via pressing/actuating the button 280.

If desired, in some examples the system may also present a notification 295 that a timed release of the player's (predicted) command has been executed based on the player 200 beginning to provide the command but not yet completing the command. Also, if desired a stop selector 297 may be presented. The stop selector 297 may be selected based on voice command, gesture command, controller command, etc. to do at least one or two different things. First, the stop selector 297 may be selected to command the system to stop executing user commands based on predictions in advance of the player 200 actually completing the commands, at least for that game instance.

Second, selection of the stop selector 297 may additionally or alternatively be used as feedback for additional training of a machine learning (ML)-based model configured to make inferences about partial performance of user commands and/or release times for those commands. Thus, here stop selector selection may be used to instigate additional training of a ML-based model using data from this user command instance, labeling the generated training data and ground truth combination as relating to an "incorrect" inference of a command prediction and/or release time. This may help improve the model for future inferences.

Figure 3B:
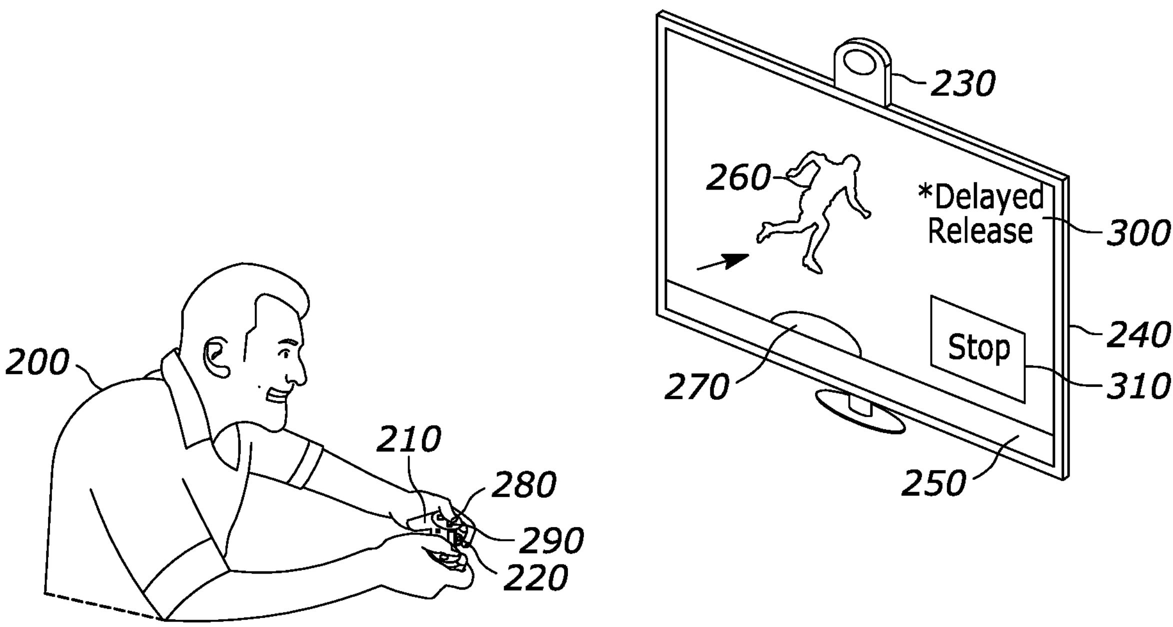

FIGS. 3A and 3B show another example of the same player 200 with the same hardware and game setup as in FIG. 2. However, per these figures, instead of the system predicting a user command and executing the command in advance of the player 200 completing the command itself, here the system delays a fully completed, received, and processed/queued command to also correctly align with the game content itself. Accordingly, FIG. 3A shows that the player's thumb 280 has fully pressed down the button 290, providing a command for the character 260 to jump. However, while the system registers the command, it delays release of the command to the game engine and accordingly the character 260 does not jump but rather continues running toward the rock 270 as it otherwise would.

FIG. 3B then shows that at a later time, the player's thumb 280 is distanced from the button 290 again as the command itself has already been provided. This figure also illustrates the command being released from a memory/RAM buffer when the character 260 gets close enough to the rock 270 to fully jump over the rock 270. Note here that if desired, the system may also present a notification 300 that a release of the player's received command has been delayed based on the command itself being completed too soon before the appropriate time in the game itself at which the command is inferred as optimal for release.

Also, if desired a stop selector 310 may be presented. The stop selector 310 may be selected based on voice command, gesture command, controller command, etc. to do at least one or two different things. First, the stop selector 310 may be selected to command the system to stop delaying execution of completed user commands, at least for that game instance.

Second, selection of the stop selector 310 may additionally or alternatively be used as feedback for additional training of a ML-based model configured to make inferences about delayed release times for received commands. Thus, here stop selector selection may be used to instigate additional training of a ML-based model using data from this user command instance, labeling the generated training data and ground truth combination as relating to an "incorrect" inference of a command delay and/or release time. This may help improve the model for future inferences.

Figure 4:
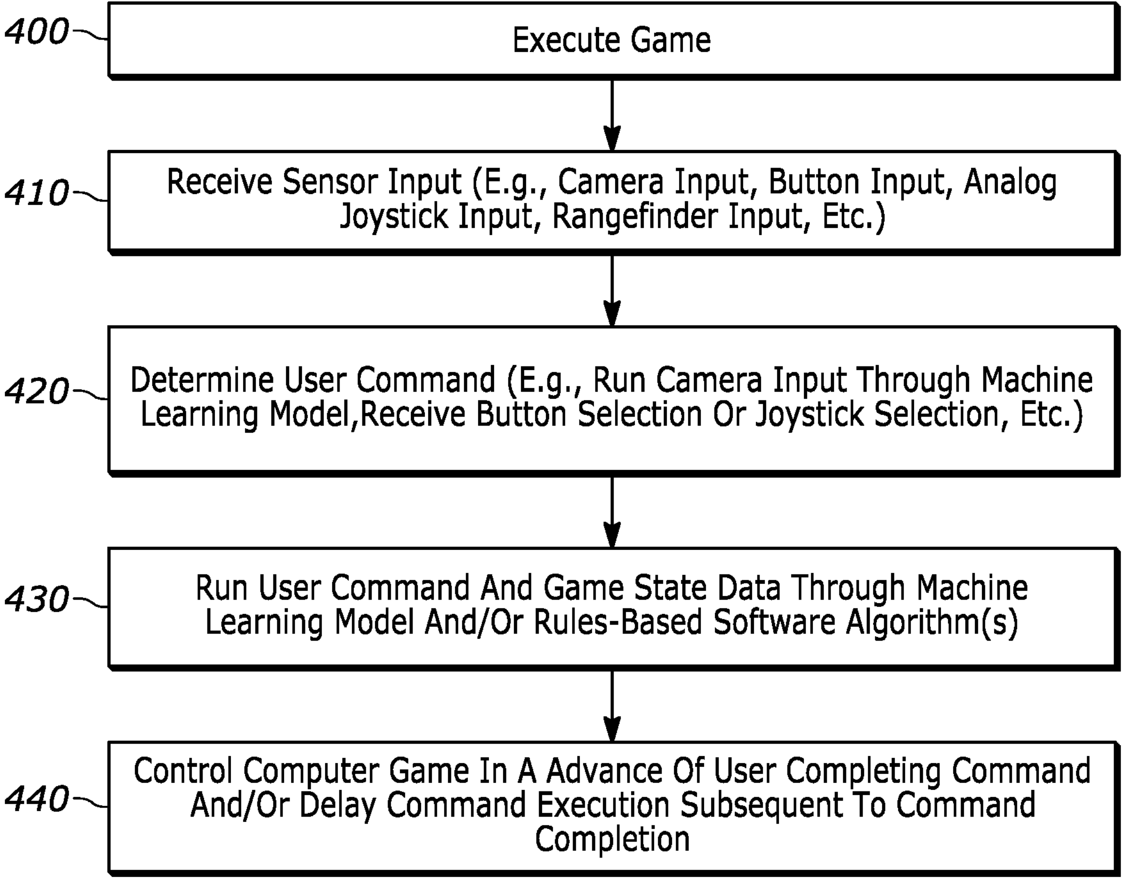
FIG. 4 is an example flow chart of example overall logic executable by one or more devices consistent with present principles.

Referring now to FIG. 4, it shows example logic that may be executed by one or more devices consistent with present principles. For example, steps in the logic of FIG. 4 may be executed by one or more of a personal computer, gaming console, and/or Internet-based cloud gaming server alone or in any appropriate combination. Note that while the logic of FIG. 4 is shown in flow chart format, other suitable logic may also be used.

Beginning at block 400, the device may execute a computer game. This might include, for instance, using a game engine to load an instance of the video game and then presenting the computer game. From block 400 the logic may then proceed to block 410.

At block 410, the device may receive sensor input from one or more sensors of various types. For example, at block 410 the device may receive input from a camera, input from a microphone, input from a depressable video game controller button, input from an analog joystick assembly on the video game controller, input from a laser rangefinder and/or proximity sensor, etc.

From block 410 the logic may then proceed to block 420. At block 420 the device may determine a user command to the computer game based on the input. The device might do so various ways, alone or in combination. In one particular example, the device may provide camera input (e.g., video) of a gesture to a first machine learning (ML) model while the gesture is still being performed but not yet completed for the first ML model to then infer a user command based on the input in advance of the user actually completing the command. The inference may be received from an activation layer of the first ML model. The gesture itself might be a gesture in free space, such as a person raising his or her hand upright in the air to command the game's character to stop its virtual motion. Or the gesture might be the beginning of a button press or joystick manipulation using the respective hardware components on the video game controller.

As another example, at block 420 the device might determine a user command based on receipt of digital input generated based on actual selection of the video game controller button, or even digital input converted from the analog joystick input that was generated based on the user's maneuver of an analog joystick on the controller. Additionally or alternatively, speech recognition software may be executed on voice input to a microphone to identify a partial or fully-spoken voice command that is audibly provided by the user. Here the complete command may even be inferred from a partial voice command by an ML-based model configured to infer full commands from partial voice input (e.g., prior to the voice command being fully spoken).

From block 420 the logic may proceed to block 430. At block 430 the device may provide the determined user command as well as game state data provided by the game engine as input to another ML model, referred to as a "second ML model" for the rest of the description of FIG. 4. The second ML model may be different from the first ML model and/or may be part of a same overall multi-function ML model that includes the first ML model.

The second ML model may be configured to infer, based on the game state data and inferred/determined user command, a time at which to control the computer game according to the user command. The inferred time may be an output from an activation layer of the ML model. The game state data may include a number of different things, such as virtual video game character nature and ability, character location within the virtual game world, time remaining to complete a level, number of character lives remaining, amount and type of items in the character's weapons arsenal, points/coins already earned by the character, virtual interactable objects around the character, other characters around the user's character in the virtual world, etc. The second ML model may therefore be trained to make such inferences using at least one dataset of game state data, user commands, and respective ground truth times at which to control one or more computer games. Supervised and reinforcement learning might be used for training, as examples.

In addition to or in lieu of running the user command and game state data through the second ML model, one or more rules-based software algorithms may be used to determine, based on the game state data and the determined user command, the time at which to control the computer game according to the user command. Specific rules-based algorithms may be set by a game developer, console manufacturer, or other third party. The algorithm(s) may be specific to the game (or not), and may be executed in the game engine itself or external to it at the console/device/server level.

As an example, one rules-based algorithm may be disallowing a character from jumping over a rock when the character is more than a threshold virtual distance away from the rock, and then allowing the character to jump over the rock responsive to the character coming within the threshold virtual distance. Another example algorithm may involve commanding the user's virtual character to jump over the rock in advance of coming too close to the rock to jump over it (e.g., and instead hit a front wall of the rock). Another example may be disallowing the virtual character from drawing a certain weapon until another game character appears for which the weapon can be used to combat that other character, and then allowing the weapon to be drawn responsive to the other game character appearing onscreen.

As but a few more rules-based algorithm examples, the character may be disallowed from shooting a virtual gun until an intended target is within virtual range of the gun's ammunition (and then firing the gun responsive to the intended target coming within range), and/or not executing a sword swinging action until another character is within range to be struck by the sword (and then allowing the swinging action responsive to the other character being within range). Also, a user command might be executed to shoot the virtual gun or swing the virtual sword in advance and while the other virtual character is still within shooting or striking range if it is determined that the other virtual character is moving toward the out-of-range threshold.

From block 430 the logic may proceed to block 440. At block 440 the device may actually control the computer game according to the first user command by, based on the game context(s), executing the command in advance of the user completing the user command or delaying control of the computer game according to the user command subsequent to the user completing the user command until an appropriate time is reached to control the game according to the command. In various examples, controlling the computer game according to the user command may include executing the user command itself and/or executing other downstream game actions that result from execution of the user command.

Thus, as an example consistent with the logic of FIG. 4, the device might receive input from a camera indicating a partial user command and determine, based on the input from the camera, the user command in advance of the user completing the command. Again, the command might be a computer game controller command (e.g., generated based actuation of a controller button or joystick) or the gesturing of a command in free space that is not directed to any input device other than the camera itself. Based on the device inferring the user command before it is completed and based on the game state data being used to determine that the command should be executed at the present time rather than a later time when the user might complete the command (e.g., the game state data being used to identify a game action as occurring for which the user command is to be presently executed), the device may release the command to the game/engine to control the computer game according to the user command at the present time. Again, this may be in advance of the user actually completing the user command, and hence in advance of the device receiving camera input indicating a completed gesture and/or in advance of the device receiving digital input generated based on actuation of the computer game controller element that is predicted to be used to provide the user command (e.g., joystick or button).

As another example consistent with the logic of FIG. 4, the device might receive input generated based on actuation of a video game wireless controller button and determine the user command based on the input generated based on the actuation of the controller button. Again note that this might be an analog or digital input from the controller itself. The device may then control the computer game according to the user command by delaying release of the command to a later time that is subsequent to the time the user completes the user command (and/or later than when the command is registered), and then releasing/executing the user command after the delay at a later time determined as appropriate. For example, the later time may be determined as appropriate based on the game state data and may be a time at which a game action is occurring for which to apply the user command. E.g., the device may not execute the user command until a reciprocal game action occurs for which the user command is to be executed, and then the device may execute the command based on the game action occurring.

Figure 5:
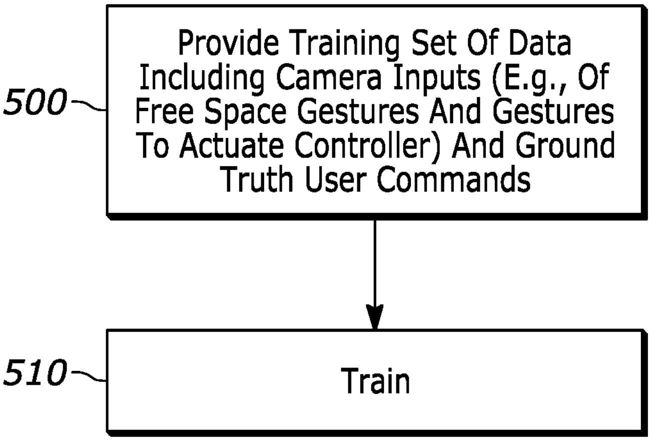
FIG. 5 shows example training logic that may be executed to train a machine learning (ML) model to infer user commands based on partial gestures consistent with present principles.

FIG. 5 shows additional logic that may be executed by the device(s) of FIG. 4 to train the first ML model of FIG. 4 before deployment and/or for additional training after deployment. Beginning at block 500, the logic may provide, as training input, at least one dataset that includes camera inputs and respective ground truth user commands. The dataset may therefore include, as an example, videos of gestures being partially performed and respective ground truth user commands as labels. To enhance inference accuracy even further, the dataset might also include videos of gestures being fully performed and respective ground truth user commands as labels so that the model can be trained on the fully-performed gestures for reference to also make inferences for similar but partial gestures. And note here again that the camera inputs of the training dataset(s) may shows gestures in free space and/or gestures to actuate computer game controllers (and/or other digital input devices). Thus, from block 500 the logic may proceed to block 510 to actually train the model using the at least one dataset.

The first ML model may include neural networks, decision trees, and/or support vector machines, and the training itself may include supervised, unsupervised, and/or reinforcement learning. As an example, for supervised learning the ML model may be trained using labeled data (the labeled ground truth user commands), where each training set includes a camera input(s) and its corresponding ground truth user command. The model may learn to map camera inputs to user commands by minimizing the difference between its predictions and the ground truth commands.

As another example, for reinforcement learning, the first ML model may learn to map camera inputs to user commands by interacting with the game environment and receiving feedback in the form of rewards or penalties. The model may thus learn to optimize its mapping strategy to maximize the cumulative reward over time.

What's more, regardless of training implementation, in some instances the ML model can also be trained for player-specific customization to render even more accurate inferences for that particular player. Thus, in some specific example embodiments the model may learn to adapt its user command inferences to the individual gesture movements and styles of a given player. To do so, the model may be trained on camera inputs collected from a specific player and thus incorporate player-specific information into the model's input features to render a particular model version to be used for that player.

Figure 6:
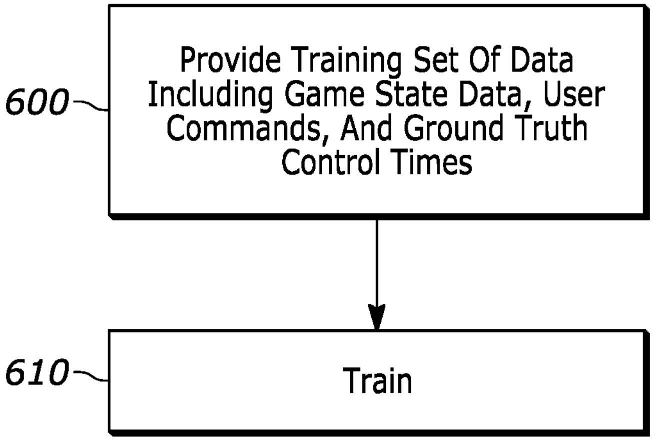
FIG. 6 shows example training logic that may be executed to train a ML model to infer release times for identified user commands consistent with present principles.

Before moving on to the description of FIG. 6, also note that an ML model might be similarly trained but for voice input by using at least one dataset of partial and full voice inputs and respective ground-truth user commands for those partial or full voice inputs (e.g., partially or fully speaking a voice command).

Continuing the detailed description now in reference to FIG. 6, it too shows additional logic that may be executed by the device(s) of FIG. 4 but this time to train the second ML model of FIG. 4 before deployment and/or for additional training after deployment. Beginning at block 600, the logic may provide, as training input, at least one dataset that includes game state data, user commands, and respective ground truth times at which to control one or more computer games. The dataset may therefore include, as an example, game state data and user commands as well as respective ground truth times (as labels) at which to release the commands based on the game state data and commands themselves. From block 600 the logic may proceed to block 610 to actually train the model using the at least one dataset.

The second ML model may include neural networks, decision trees, and/or support vector machines, and the training itself may include supervised, unsupervised, and/or reinforcement learning. As an example, for supervised learning the ML model may be trained using labeled data (the labeled ground truth release/execution times), where each training set includes a respective user command and game state data and its corresponding ground truth release time. The model may learn to map commands/game state data to release time by minimizing the difference between its predictions and the ground truth times.

As another example, for reinforcement learning, the second ML model may learn to map user commands/state data to release times by interacting with the game environment and receiving feedback in the form of rewards or penalties. The model may thus learn to optimize its mapping strategy to maximize the cumulative reward over time.

What's more, regardless of training implementation, in some instances the ML model can also be trained for player-specific customization to render even more accurate inferences for that particular player. Thus, in some specific example embodiments the model may learn to adapt its release time inferences to the individual player, which might be particularly useful when an appropriate release time is not a single point in time per se but a window of time of a particular duration and where the player consistently inserts an action at a particular time or sub-duration within the larger release time duration. To do so, the model may be trained on game commands collected from a specific player and thus incorporate player-specific information into the model's input features to render a particular model version to be used for that player.

Figure 7:
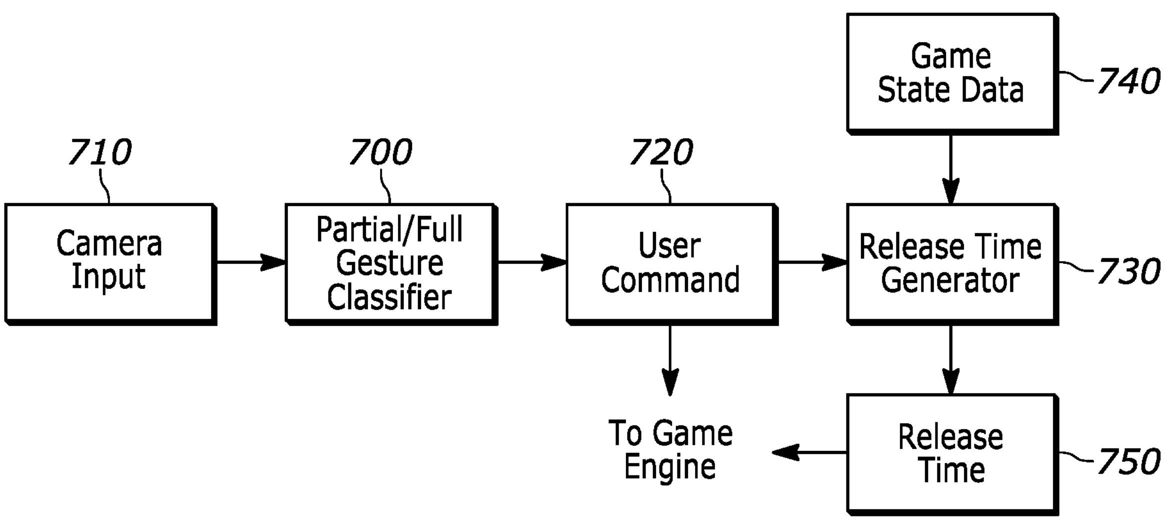
FIG. 7 shows example artificial intelligence software architecture for the ML model(s) consistent with present principles.

Moving on to FIG. 7, example artificial intelligence architecture for an ML model that may be used consistent with present principles is shown. The architecture includes a gesture classifier 700 into which camera input 710 may be input so that features of gestures may be inferred using the feature extractor of the classifier 700 to thus infer the gesture command itself. In certain non-limiting instances, this process may involve use of gesture recognition, action recognition, and other computer vision techniques to identify body features and motion/patterns of those body features. The classifier 700 itself might be established by one or more convolutional neural networks, for example.

Inferred user commands 720 output by the activation layer of the classifier 700 may then be provided as input both to the game engine itself (e.g., to be placed into a buffer for release at an inferred/appropriate time) and to a release time generator 730 that might be established by one or more feed-forward, recurrent and/or convolutional neural networks. The release time generator 730 may then, based on its training, infer the appropriate release time for a given set of user command input 720 and game state data 740 that is also input to the generator 730. Thus, output inference 750 from the activation layer of the generator 730 may indicate the inferred release time. The output inference 750 may then be provided to the game engine. In some specific examples, the output 750 may also include a tag indicating the particular user command to which the respective release time pertains so that the device can match it to the user command 720 as already queued in the game engine buffer for subsequent playout/execution.

Figure 8:
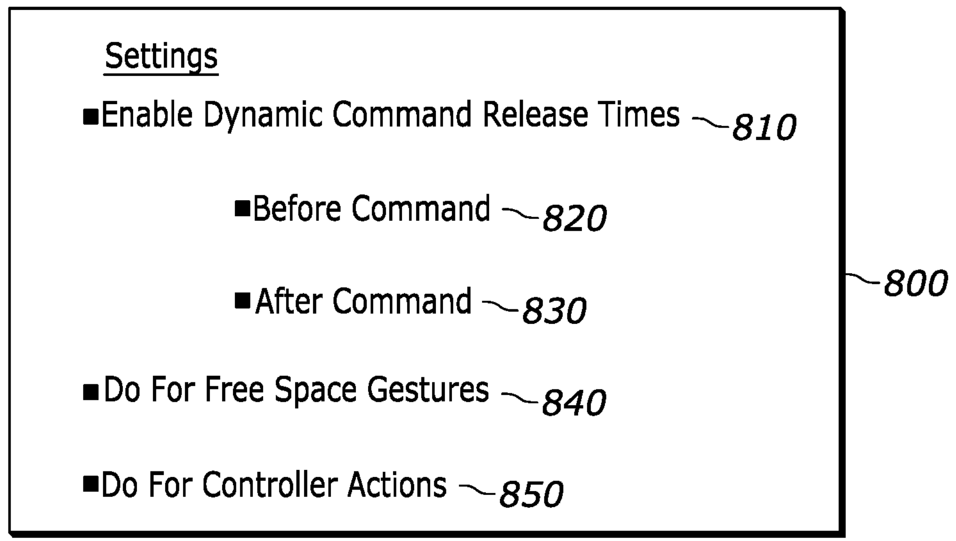
FIG. 8 shows an example settings graphical user interface (GUI) that may be used to configure one or more settings of a system to operate consistent with present principles.

Now in reference to FIG. 8, an example settings graphical user interface (GUI) is shown that may be presented on a display to configure one or more settings of a client device, console, computer game, etc. to undertake present principles. The GUI 800 may be presented based on a user navigating a device or game menu, for example. The example options described below may be selected via touch, cursor, or other input directed to the associated check box per this example.

As shown in FIG. 8, the GUI 800 may include a first option 810 that may be selectable a single time to set/configure the device to, in multiple future instances, control computer games based on user commands by advance or delayed release of the commands consistent with present principles. So, for example, selection of the option 810 may configure the device to in the future take the actions described above, including those in reference to FIGS. 2, 3A. 3B, and 4. Additionally, if the user wishes to set the device to only do one or the other (command release in advance or delay command release), sub-options 820, 830 may be auto-checked based on the option 810 being checked and then deselected by the user should the user so choose.

As also shown in FIG. 8, the GUI 800 may include an option 840 that may be selectable to configure the device to undertake present principles only for free-space gestures if desired, as well as an option 850 that may be selectable to configure the device to undertake present principles only for video game controller input device actions (gesture or actual controller input element actuation).

While the particular embodiments are herein shown and described in detail, it is to be understood that the subject matter which is encompassed by the present invention is limited only by the claims.

What is claimed is:

1. An apparatus, comprising: at least one processor assembly programmed with instructions to: execute a computer game; receive input from a sensor;

generate, based on the input from the sensor, a predicted user command to the computer game, the generating comprising processing the input from the sensor using a first machine learning model;

determine, based on the predicted user command, a time for controlling the computer game according to the predicted user command, the determining comprising processing the predicted user command generated by the first machine learning model using a second machine learning model that is separate and distinct from the first machine learning model, wherein the second machine learning model receives as input both the predicted user command and game state data of the computer game; and control the computer game according to the predicted user command at the determined time, the computer game controlled according to the predicted user command by one or more of: controlling the computer game according to the predicted user command in advance of a user completing the predicted user command, delaying control of the computer game according to the predicted user command subsequent to the user completing the predicted user command.

2. The apparatus of claim 1, wherein the sensor comprises a camera, and wherein the at least one processor assembly is programmed with instructions to:

receive input from the camera;

generate, based on the input from the camera, the predicted user command; and control the computer game according to the predicted user command in advance of the user completing the predicted user command.

3. The apparatus of claim 2, wherein the at least one processor assembly is programmed with instructions to:

identify a game action as occurring for which the predicted user command is to be executed; and based on the identification, control the computer game according to the predicted user command in advance of the user completing the predicted user command.

4. The apparatus of claim 2, wherein the predicted user command comprises a gesture command.

5. The apparatus of claim 2, wherein the predicted user command comprises a computer game controller command.

6. The apparatus of claim 2, comprising the camera.

7. The apparatus of claim 1, wherein the sensor comprises a controller button, and wherein the at least one processor assembly is programmed with instructions to:

receive input generated based on actuation of the controller button;

generate, based on the input generated based on actuation of the controller button, the predicted user command; and control the computer game according to the predicted user command at the determined time by delaying control of the computer game according to the predicted user command until a time subsequent to the user completing the predicted user command, wherein the time subsequent to the user completing the predicted user command matches the determined time.

8. The apparatus of claim 7, wherein the at least one processor assembly is programmed with instructions to:

delay control of the computer game according to the predicted user command until a game action occurs at the determined time for which the predicted user command is to be executed; and based on the game action occurring at the determined time, control the computer game according to the predicted user command.

9. The apparatus of claim 1, wherein the at least one processor assembly is programmed with instructions to:

use the first machine learning model to infer the predicted user command in advance of the user completing the predicted user command.

10. The apparatus of claim 1, comprising the at least one processor assembly.

11. The apparatus of claim 1, wherein the first machine learning model and the second machine learning model are elements of a multi-function machine learning model.

12. A method, comprising: receiving input from a sensor;

generating, based on the input from the sensor, a predicted user command to a first computer game, the generating comprising processing the input from the sensor using a first machine learning model;

determining, based on the predicted user command, a time for controlling the first computer game according to the predicted user command, the determining comprising processing the predicted user command generated by the first machine learning model using a second machine learning model that is separate and distinct from the first machine learning model, wherein the second machine learning model receives as input both the predicted user command and game state data of the computer game; and controlling the first computer game according to the predicted user command at the determined time, the first computer game controlled according to the predicted user command by one or more of: controlling the first computer game according to the predicted user command in advance of a user completing the predicted user command, delaying control of the first computer game according to the predicted user command subsequent to the user completing the predicted user command.

13. The method of claim 12, comprising:

providing, as an input to the first machine learning model, camera input, the camera input indicating the predicted user command;

receiving, as an output from an activation layer of the first machine learning model, an inference of the predicted user command; and using the inference for generating the predicted user command.

14. The method of claim 13, wherein the first machine learning model is trained on at least one dataset of camera inputs and respective ground truth user commands.

15. The method of claim 14, wherein at least some of the camera inputs of the at least one dataset indicate user gestures to actuate computer game controllers.

16. The method of claim 12, comprising: receiving, as an output from an activation layer of the second machine learning model, an inference based on the game state data, the inference indicating the determined time for controlling the first computer game according to the predicted user command; and controlling, at the determined time indicated by the inference, the first computer game according to the predicted user command.

17. The method of claim 16, wherein the second machine learning model is trained on at least one dataset of game state data, user commands, and respective ground truth times for controlling one or more computer games.

18. The method of claim 12, wherein determining the time for controlling the first computer game according to the predicted user command comprises:

using a rules-based software algorithm to determine, in part and based on game state data and the predicted user command, the time for controlling the first computer game according to the predicted user command.

19. A system comprising: at least one computer medium that is not a transitory signal and that comprises instructions executable by at least one processor assembly to:

generate a predicted user command to a computer game, the generating comprising processing input from a sensor using a first machine learning model;

determine, based on the predicted user command, a time for controlling the computer game according to the predicted user command, the determining comprising processing the predicted user command generated by the first machine learning model using a second machine learning model that is separate and distinct from the first machine learning model, wherein the second machine learning model receives as input both the predicted user command and game state data of the computer game; and release the predicted user command to the computer game at the determined time, the determined time being a time during which a game action occurs for which the predicted user command is to be executed, the determined time being different from a second time at which the predicted user command is completed.

20. The system of claim 19, wherein the instructions are executable to, one or more of:

release the predicted user command in advance of receiving input generated based on actuation of a computer game controller button that is predicted to be used to provide the predicted user command; or delay release of the predicted user command subsequent to a user completing the predicted user command based on a determination that the game action has not yet occurred for which to apply the predicted user command.

* * * * *